US008109307B2

(12) United States Patent  (10) Patent No.: US 8,109,307 B2
Oyama  (45) Date of Patent: Feb. 7, 2012

(54) PNEUMATIC TIRE WITH TREAD HAVING PROTRUSIONS ON BOTTOM OF GROOVES

(75) Inventor: Toshiro Oyama, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 791 days.

(21) Appl. No.: 11/522,027

(22) Filed: Sep. 15, 2006

(65) Prior Publication Data

US 2007/0062626 A1  Mar. 22, 2007

(30) Foreign Application Priority Data

Sep. 21, 2005 (JP) ............... 2005-273219
Aug. 10, 2006 (JP) ............... 2006-217991

(51) Int. Cl.
B60C 11/11 (2006.01)
B60C 11/13 (2006.01)

(52) U.S. Cl. ............... 152/209.21; 152/DIG. 1; 152/902

(58) Field of Classification Search ............ 152/209.18, 152/209.19, 209.21, 209.22, DIG. 1, 902
See application file for complete search history.

(56) References Cited

U.S. PATENT DOCUMENTS 3,727,661 A * 4/1973 Hoke ............. 152/209.22
4,345,632 A * 8/1982 Takigawa et al. ... 152/209.19
4,542,778 A   9/1985 Thielemann et al.
4,747,435 A   5/1988 Trabandt et al.
5,115,850 A   5/1992 Crump et al.
5,160,385 A * 11/1992 Goto et al. ....... 152/209.19
5,417,269 A * 5/1995 Kinoshita et al. ... 152/209.19
5,492,161 A   2/1996 Fuchikami et al.
5,975,172 A   11/1999 Nakatsuji
6,119,744 A   9/2000 Tsukagoshi
6,481,480 B1  11/2002 Schuster et al.
6,601,624 B2 * 8/2003 Ratliff, Jr. ........ 152/209.19
7,004,216 B2  2/2006 Godefroid
2002/0092591 A1 * 7/2002 Cortes ............. 152/209.18
2005/0103416 A1 * 5/2005 Rooney et al. ..... 152/209.16
2005/0230020 A1 * 10/2005 Miyake ............ 152/209.19
2008/0149242 A1 * 6/2008 Oyama ............ 152/209.19

FOREIGN PATENT DOCUMENTS

| JP | 61-291203 | | 12/1986 |
| JP | 06-239107 | * | 8/1994 |
| JP | 06-239108 | * | 8/1994 |
| JP | 10-035225 | * | 2/1998 |
| JP | 10-076810 | * | 3/1998 |
| JP | 2001-030715 | * | 2/2001 |
| JP | 2003-054220 | * | 2/2003 |
| WO | 98/03357 | * | 1/1998 |

OTHER PUBLICATIONS

Machine translation for Japan 10-076810 (no date).*

* cited by examiner

*Primary Examiner* — Steven D Maki
(74) *Attorney, Agent, or Firm* — Greer, Burns & Crain, Ltd.

(57) ABSTRACT

A pneumatic tire includes a plurality of protrusions on a bottom of each of the grooves. The height of the protrusion is variable in a profile of the protrusion in a circumference direction of the pneumatic. The protrusion has at least one peak portion that protrudes away from a center of the pneumatic tire. The pneumatic tire further includes a connection member between the protrusion and an adjacent one of the lands, the connection member having a first end toward the land and a second end toward the peak portion, a height of the first end from the bottom of the groove being larger than that of the second end.

6 Claims, 8 Drawing Sheets

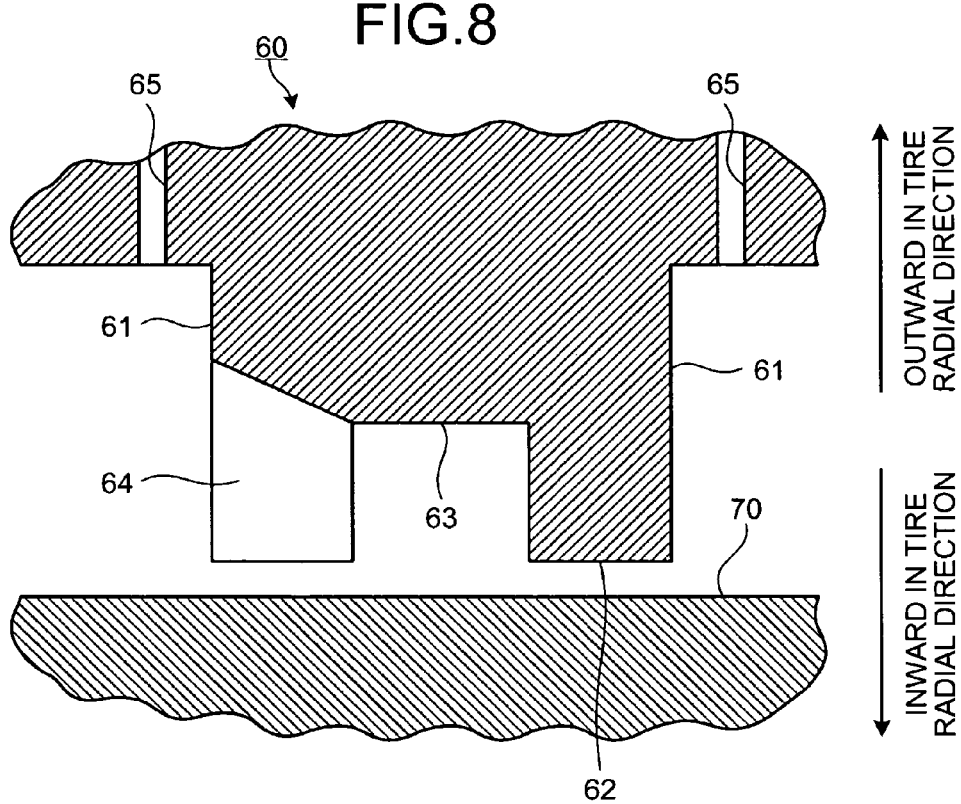
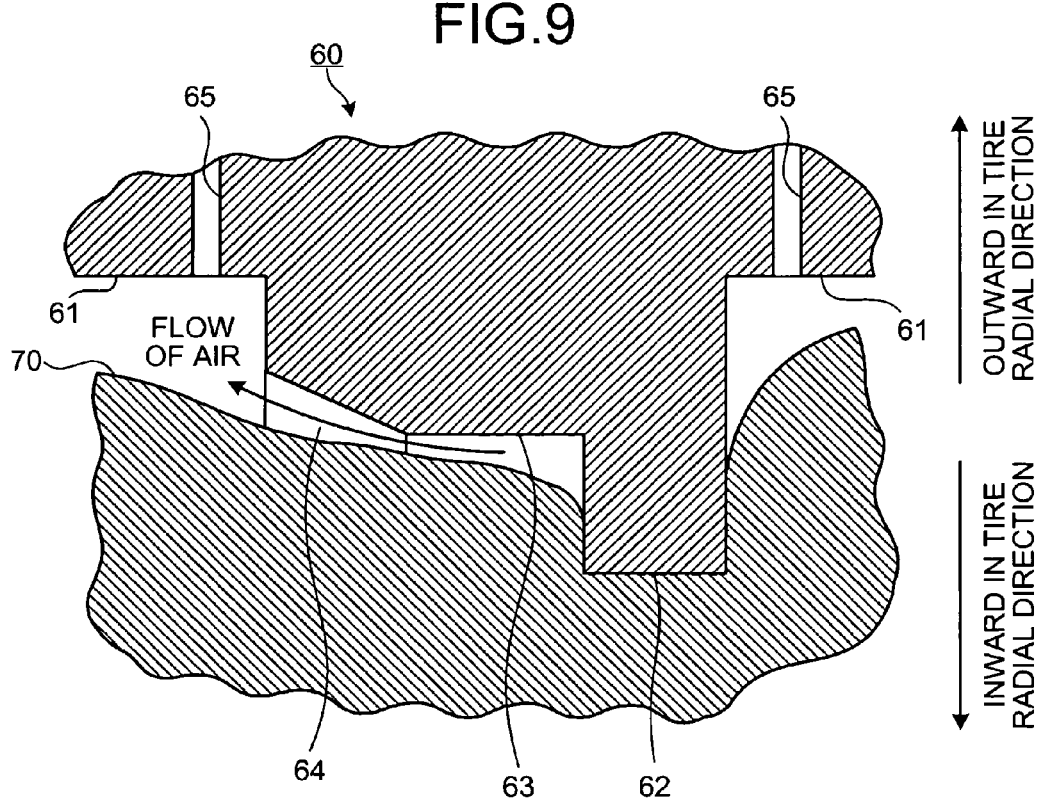

PNEUMATIC TIRE WITH TREAD HAVING PROTRUSIONS ON BOTTOM OF GROOVES

BACKGROUND OF THE INVENTION

1. Field of the Invention

The present invention generally relates to a pneumatic tire. The present invention specifically relates to a pneumatic tire capable of suppressing stone trapping.

2. Description of the Related Art

Stones are sometimes trapped within grooves that are formed on the tread area of pneumatic tires of vehicles. When the stones are trapped within the grooves, so-called "stone drilling" may occur. The stone drilling is a phenomenon that stones penetrate the bottoms of the grooves due to rolling of the pneumatic tire to cause damage to the tread area. To take care of this issue, some of the conventional pneumatic tires have protrusions in the grooves to minimize stone trapping in the grooves. Due to the provision of the protrusions, even if stones enter the grooves, the stones are ejected to the outside of the grooves by the elastic force of the protrusion.

When manufacturing pneumatic tires having protrusions in the grooves, however, the protrusions become obstacle to flow of rubber for forming the tread area inward in the tire radial direction of the protrusion. This may increase the pressure of the rubber located inward of the protrusion in the tire radial direction, and associated with this, a breaker ply located inward of the protrusion in the tire radial direction can get deformed into a wavy shape. If the breaker ply is deformed in this manner, abnormal wear may occur to the pneumatic tire due to the deformation in the breaker ply when a vehicle to which the pneumatic tires are fit travels.

Some of the conventional pneumatic tires have a configuration that makes it possible to suppress the deformation of the breaker ply when the protrusions are provided in the grooves. For example, in Japanese Patent Application Laid-Open No. S61-291203, a plurality of protrusions are provided in grooves that extend in a zigzag shape in the tire circumferential direction, and connection members for connecting the protrusions to the sidewalls of the grooves are provided in locations where the adjacent protrusions in the tire circumferential direction are provided alternately in the tire width direction. In such a structure, the rubber located inward of the protrusion in the tire radial direction can escape in the direction of a land during manufacture of the pneumatic tire. It is, therefore, possible to prevent the pressure of the rubber located inward thereof in the tire radial direction from becoming too high. Consequently, it is possible to suppress the deformation of the breaker ply located inward of the protrusion in the tire radial direction and to reduce the abnormal wear.

The protrusion provided in the groove ejects the stone entering the groove to the outside of the groove by the elastic force of the protrusion, and prevents the stone trapped within the groove from reaching the breaker ply by the volume of the protrusion. Therefore, the protrusion needs to have a predetermined height and a predetermined volume to fulfill these functions. Greater effect of suppressing stone trapping can be obtained if the height is larger or if the volume is larger. However, if the protrusion is too large, then the rubber does not satisfactorily flow into a mold for forming the protrusion, and it is difficult to discharge the air present between the mold and the rubber during manufacture of the pneumatic tire. As a result, the pneumatic tire is manufactured without obtaining a targeted shape of the protrusion, which causes failure in manufacture, i.e., occurrence of "bare" (depressed area).

SUMMARY OF THE INVENTION

It is an object of the present invention to at least partially solve the problems in the conventional technology.

According to an aspect of the present invention, a pneumatic tire having a tread area, the tread area being divided into a plurality of lands by virtue of a plurality of grooves, includes a plurality of protrusions on a bottom of each of the grooves, a height of the protrusion from the bottom of the groove in a profile of the protrusion in a circumference direction of the pneumatic tire being variable, the protrusion including at least one peak portion that protrudes away from a center of the pneumatic tire; and a connection member between the protrusion and an adjacent one of the lands, the connection member having a first end toward the land and a second end toward the peak portion, a height of the first end from the bottom of the groove being larger than that of the second end.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic of a mold and a tread rubber for explaining a state before the tread area is subjected to vulcanization molding;

FIG. 9 is a schematic of the mold and the tread rubber for explaining the state in which the tread area is being subjected to the vulcanization molding;

DETAILED DESCRIPTION OF THE PREFERRED EMBODIMENTS

Exemplary embodiments of the present invention are explained in detail below with reference to the accompanying drawings. It is to be noted that the present invention is not limited by the embodiments. Constituent elements explained in the following embodiments include those easily replaceable therewith by persons skilled in the art, or those substantially equivalent thereto. Types of pneumatic tires include a block type tread, a ribbed tread, and a ribbed-lug tread. In the following embodiments, the pneumatic tire having the block type tread will be explained as an example of the pneumatic tire.

In the embodiments, a tire width direction means a direction parallel to a rotating axis of the pneumatic tire, an inward in the tire width direction means a direction toward an equatorial plane in the tire width direction, and an outward in the tire width direction means a direction opposite to the direction toward the equatorial plane in the tire width direction. Moreover, a tire radial direction means a direction orthogonal to the rotating axis, and a tire circumferential direction indicates a direction of the tire rotating around the rotating axis.

Figure 1:
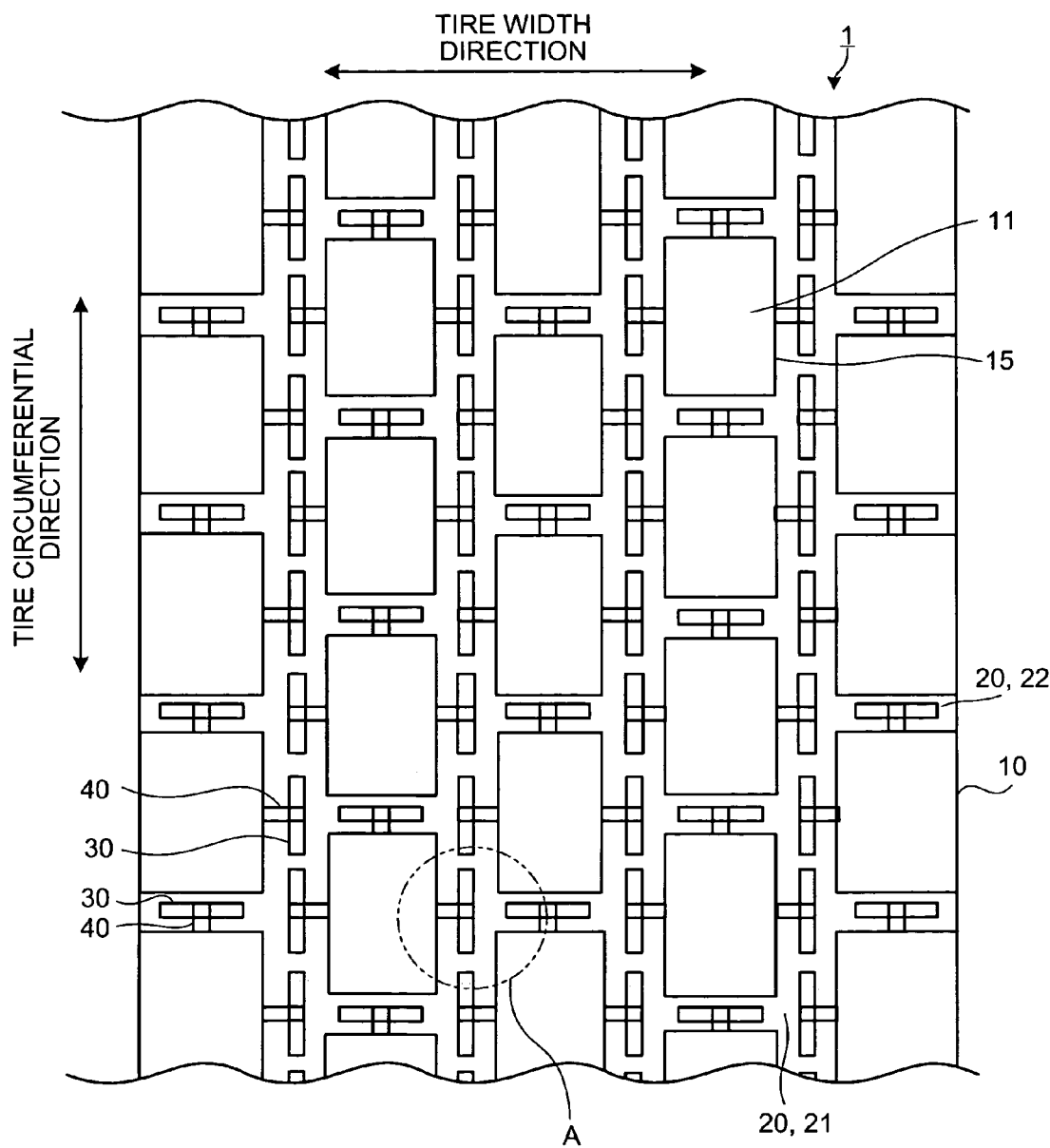
FIG. 1 is a diagram of a tread area of a pneumatic tire according to an embodiment of the present invention.

FIG. 1 is a schematic of a tread area 10 of a pneumatic tire 1 according to an embodiment of the present invention. The tread area 10, which is made of an elastic rubber material, is formed on an outermost side in the tire radial direction. A surface of the tread area 10, namely, a portion of the pneumatic tire 1 contacting a surface of the road when a vehicle (not shown) on the pneumatic tires 1 runs, is formed as a tread surface 11. A plurality of grooves 20 including those formed in predetermined directions is formed in the tread area 10. The grooves 20 include a plurality of longitudinal grooves 21 formed in the tire circumferential direction and a plurality of lateral grooves 22 formed in the tire width direction. The tread area 10 is divided by the longitudinal grooves 21 and the lateral grooves 22 into a plurality of blocks 15, which blocks are to serve as lands. Protrusions 30 are arranged at intervals in the grooves 20 for both the longitudinal grooves 21 and the lateral grooves 22, respectively.

The longitudinal groove 21 and the lateral groove 22 are not necessarily formed accurately in the tire circumferential direction or the tire width direction. It suffices that each longitudinal groove 21 is formed substantially in the tire circumferential direction. Namely, the longitudinal groove 21 can be formed aslant with respect to the tire width direction, formed to be curved, or formed into a zigzag shape. It suffices that each lateral groove 22 is formed substantially in the tire width direction. Namely, the lateral groove 22 can be formed aslant with respect to the tire circumferential direction, formed to be curved, or formed into a zigzag shape.

Figure 2:
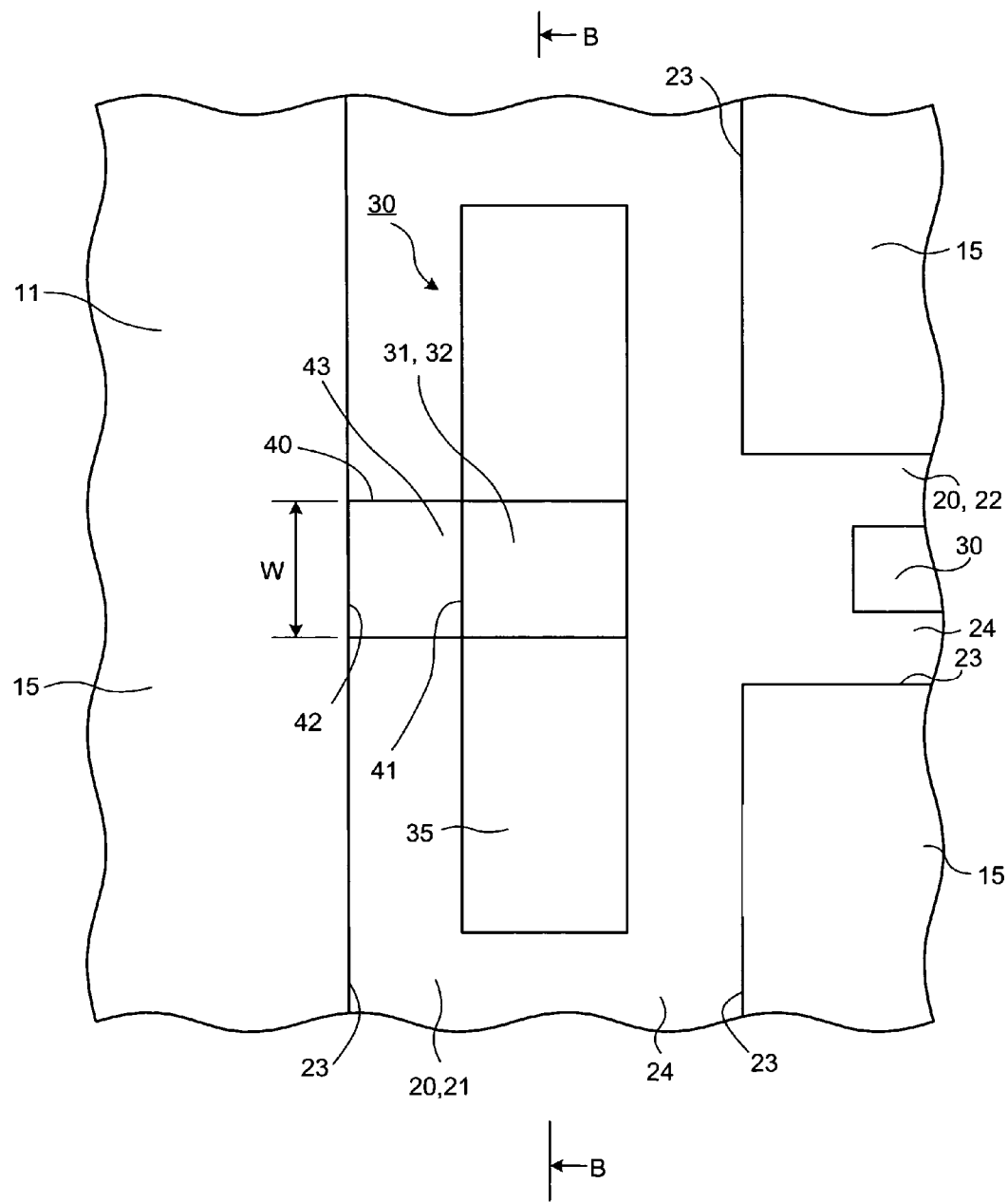
FIG. 2 is a detailed diagram of the portion A of FIG. 1.
Figure 3:
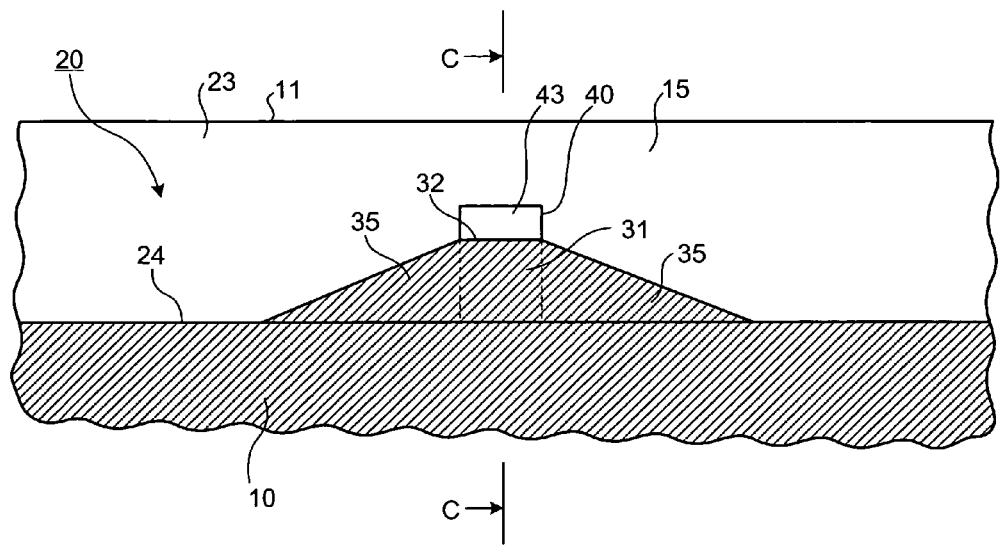
FIG. 3 is a cross-section taken along the line B-B of FIG. 2.
Figure 4:
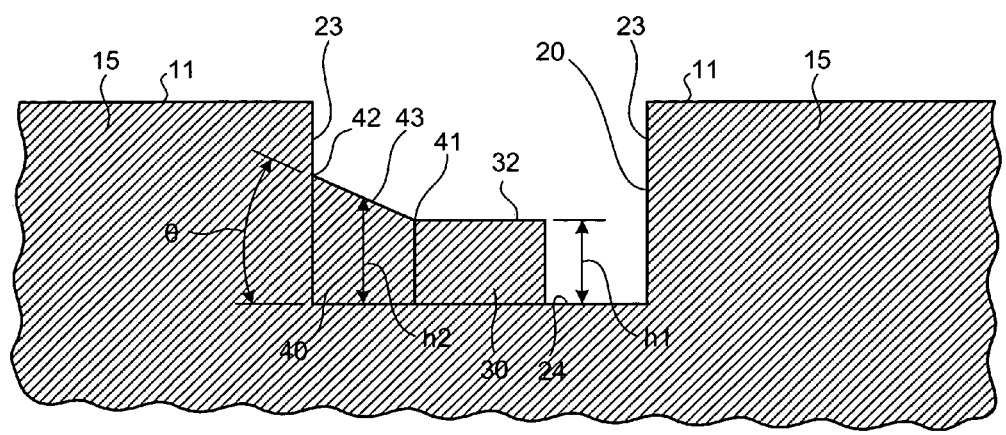
FIG. 4 is a cross-section taken along the line C-C of FIG. 3.
Figure 5:
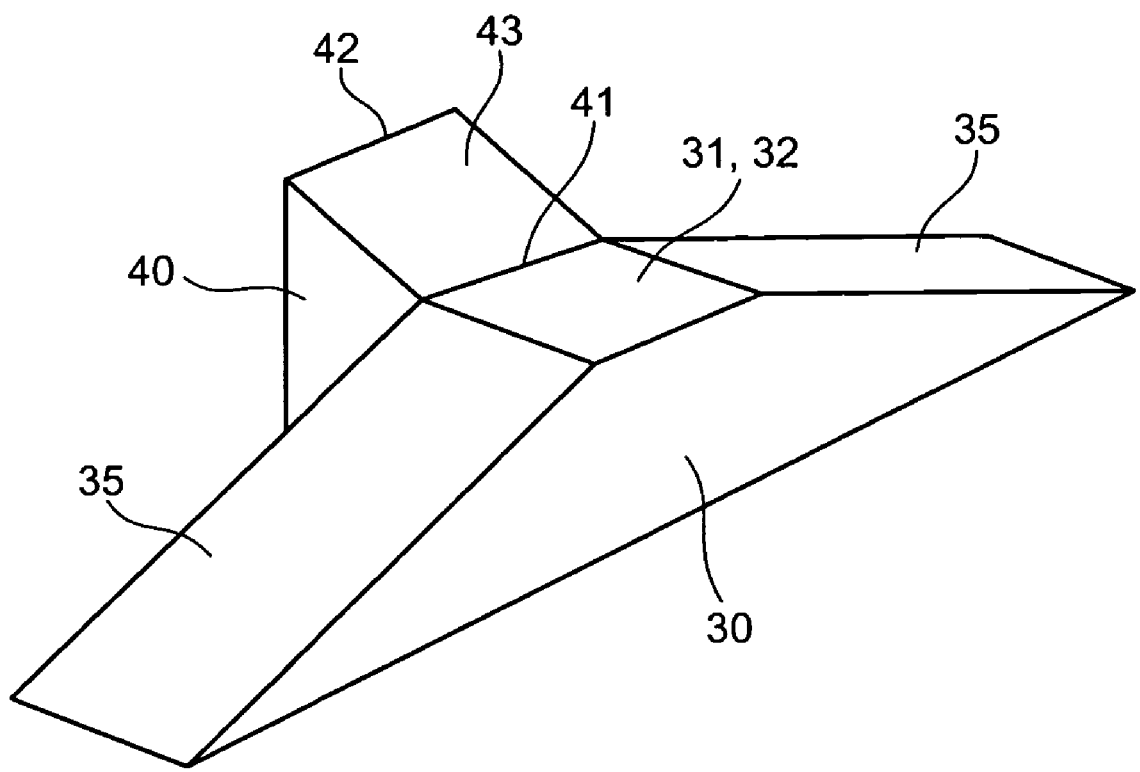
FIG. 5 is a perspective view of a protrusion and a connection member.

FIG. 2 is a detailed diagram of the portion A of FIG. 1. FIG. 3 is a cross section taken along the line B-B of FIG. 2. FIG. 4 is a cross section taken along the line C-C of FIG. 3. FIG. 5 is a perspective view of the protrusion 30 and a connection member 40. The protrusion 30 made of the same rubber material as that of the tread area 10 is formed apart from the blocks 15 or from groove walls 23 of the grooves 20. The protrusion 30 is formed to protrude outward in the tire radial direction from a groove bottom 24 of the groove 20. The protrusion 30 is also formed so that its height is smaller than that of the block 15, namely, smaller than a distance from the groove bottom 24 to the tread surface 11.

The height of the protrusion 30 thus formed, from the groove bottom 24, is changed. In other words, the protrusion 30 includes a convex portion 31 and a slope 35. The convex portion 31 protrudes outward in the tire radial direction. The slope 35 is formed such that its height from the groove bottom 24 is getting smaller as it is farther from the convex portion 31. The convex portion 31 has a top 32 that is the highest from the groove bottom 24 and parallel to the groove bottom 24. The slope 35 is provided on each side of the convex portion 31 in the direction in which the groove 20 is formed. The convex portion 31 and the slopes 35 of the protrusion 30 are respectively formed to be generally rectangle when the protrusion 30 is viewed in the depth direction of the groove 20.

The connection member 40 is formed between the protrusion 30 thus shaped and the block 15. The connection member 40 is connected to both the convex portion 31 of the protrusion 30 and the block 15. A connection end of the connection member 40, which end is connected to the convex portion 31 is a convex-side end 41, and a connection end of the connection member 40, which end is connected to the block 15 is a block-side end 42 or a land-side end. The convex-side end 41 is connected to a block 15-side surface of the convex portion 31, and the block-side end 42 is connected to a protrusion 30-side surface of the block 15 or to a portion of the groove wall 23 opposing the convex portion 31. The block-side end 42 is formed so that its height from the groove bottom 24 is larger than that of the convex portion 31 from the groove bottom 24.

More specifically, an outward surface 43 of the connection member 40, which surface is located outward in the tire radial direction, is inclined with respect to the groove bottom 24. The outward surface 43 is inclined in the direction in which it is farther from the groove bottom 24 as it directs from the convex-side end 41 toward the block-side end 42. Alternatively, the outward surface 43 is inclined to be gradually located outward in the tire radial direction. In other words, the connection member 40 is formed so that its height from the groove bottom 24 is getting larger from the convex-side end 41 toward the block-side end 42. Therefore, the relation between the convex portion 31 and the connection member 40 is represented by h2>h1, where h1 is the height of the convex portion 31 from the groove bottom 24 and h2 is the height of the connection member 40 from the groove bottom 24. Namely, the height of any part of the connection member 40 from the groove bottom 24 is always larger than that of the convex portion 31 from the groove bottom 24.

An inclination angle $\theta$ of the outward surface 43 with respect to the groove bottom 24, i.e. an inclination angle $\theta$ with respect to the groove bottom 24 from the convex-side connection end 41 over the block-side end 42 is preferably in a range from 3 degrees to 45 degrees. Furthermore, a width of the connection member 40 in the direction in which the groove 20 is formed is preferably almost the same as that of the convex portion 31 in the same direction or as that of the top 32 in the same direction. Moreover, the connection member 40 is preferably formed to satisfy the relation represented by $0.05h1 \leq W \leq 1.0h1$, where h1 is the height of the convex portion 31 from the groove bottom 24 and W is the width of the connection member 40 in the direction in which the groove 20 is formed.

Figure 6:
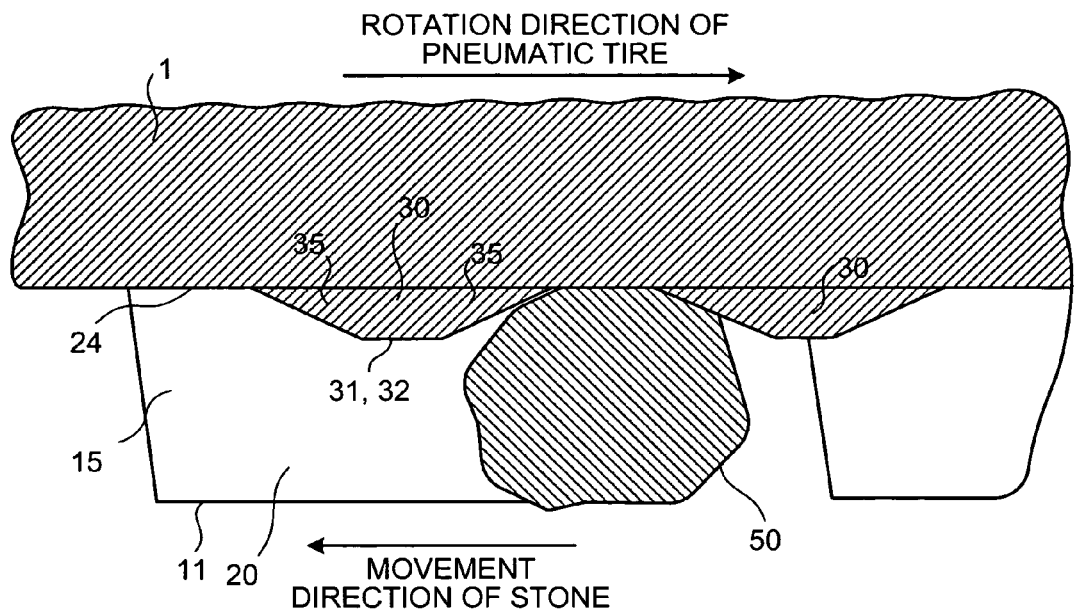
FIG. 6 is a cross-section of the pneumatic tire for explaining a state in which a stone is trapped within a groove of the pneumatic tire.
Figure 7:
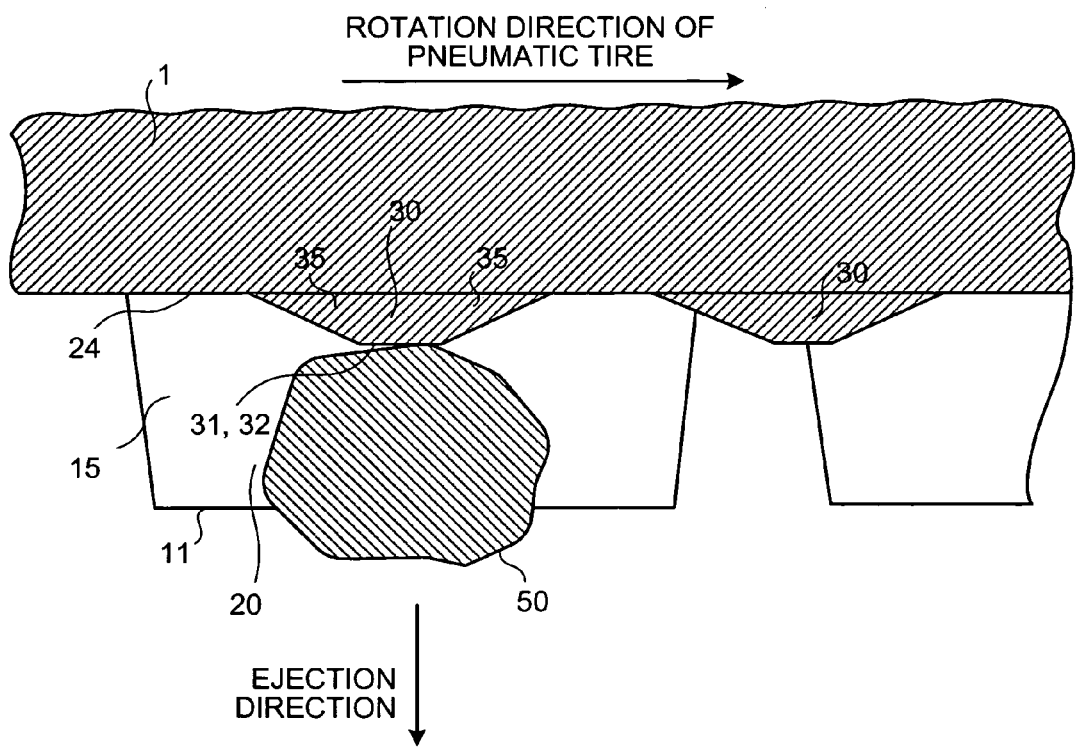
FIG. 7 is a cross-section of the pneumatic tire for explaining how the stone shown in FIG. 6 moves.

FIG. 6 is a cross-section of the pneumatic tire 1 for explaining a state in which a stone 50 is trapped within the groove. FIG. 7 is cross-section of the pneumatic tire for explaining how the stone 50 shown in FIG. 6 moves. When the vehicle with the pneumatic tires 1 runs, the pneumatic tire 1 rotates while a lower part of the tread surface 11 is in contact with the road surface (not shown). At this time, the stone 50 is often present on the road surface. If the groove 20 passes through the road surface on which the stone 50 is present, the stone 50 often enters the groove 20 and is trapped within the groove 20. If the stone 50 is trapped within the groove 20, then the stone 50 contacts with the road surface through rotation of the pneumatic tire 1, and is forced inward in the tire radial direction. The stone 50 forced inward in the tire radial direction contacts with the groove bottom 24 or the protrusions 30.

When the vehicle is running, the pneumatic tire 1 rotates even in this state. Therefore, the stone 50 that is pushed out of the groove 20 due to its size which is greater than the depth of the groove 20, that is, the stone 50 protruding from the tread surface 11 outward in the tire radial direction contacts with the road surface when the stone 50 is present on the road surface side by rotation of the pneumatic tire 1. At this time, frictional force acts between the stone 50 in contact with the road surface and the road surface. Furthermore, because of the rotation of the pneumatic tire 1, a force for moving the stone 50 in the opposite direction to the rotation direction of the pneumatic tire 1 in the groove 20 in the direction in which the groove 20 is formed acts on the stone 50.

The protrusions 30 are provided at intervals in the groove 20, and each of the protrusions 30 includes the slopes 35. Each of the slopes 35 is formed so that its height from the groove bottom 24 is getting smaller as it is farther from the convex portion 31. In other words, the slope 35 is formed so that its height from the groove bottom 24 is getting larger from a location apart from the convex portion 31 toward the convex portion 31.

The protrusion 30 is made of the same rubber material as that of the tread area 10 is formed. Therefore, the protrusion 30 has an elastic force. Because of the elastic force of the protrusion 30, if the stone 50 is to touch the protrusion 30, the stone 50 is affected by the force that moves the stone 50 from the state in which it is trapped within the groove 20.

When the pneumatic tire 1 rotates, the force for moving the stone 50 in the direction opposite to the rotation direction also acts on the stone 50 trapped within the groove 20. The stone 50, therefore, moves in the direction in which the groove 20 is formed. If the stone 50 touches the slope 35 of the protrusion 30, the stone 50 moves along the slope 35. Furthermore, if the moving direction of the stone 50 along the slope 35 is a moving direction from a position apart from the convex portion 31 toward the convex portion 31, the stone 50 moves toward the top 32 of the convex portion 31 along the slope 35. The moving direction of the stone 50 along the slope 35 is often a moving direction from a position near the convex portion 31 toward a position apart from the convex portion 31. In the latter case, similarly to the former case, the stone 50 further moves to touch the slope 35 of the adjacent protrusion 30 because a plurality of protrusions 30 are formed at intervals in the groove 20. The stone 50 thereby moves toward the top 32 of the convex portion 31 when moving along the slope 35.

In either case, the stone 50 moving in the groove 20 moves in the direction in which the groove 20 is formed, and also moves outward in the tire radial direction. When the stone 50 reaches the position of the top 32, a large part of the stone 50 is exposed from the groove 20 and a part thereof trapped within the groove 20 decreases. As a result, the stone 50 is ejected to the outside of the groove 20. Consequently, penetration of the stone 50 into the tread area 10 such as the groove bottom 24 can be suppressed. That is, the occurrence of stone drilling can be minimized.

The movement of the stone 50 trapped within the groove 20 in the direction in which the groove 20 is formed according to the rotation of the pneumatic tire 1 occurs mainly when the stone 50 is trapped within the longitudinal groove 21. However, if the lateral groove 22 is formed aslant or if the vehicle with the pneumatic tire 1 is in the cornering mode, i.e., taking a turn at a corner of the road, the stone 50 trapped within the lateral groove 22 sometimes moves in the direction in which the lateral groove 22 is formed due to the rotation of the pneumatic tire 1. Therefore, whether the groove 20 trapping the stone 50 is the longitudinal groove 21 or the lateral groove 22, the stone 50 moves in the direction in which the groove 20 is formed, and the protrusion 30 causes the stone 50 to move outward in the tire radial direction and to be ejected to the outside of the groove 20. Consequently, penetration of the stone 50 into the tread area 10 such as the groove bottom 24 can be suppressed, and the occurrence of stone drilling can be minimized.

FIG. 8 is a schematic of a mold 60 and a tread rubber 70 for explaining a state before the tread area 10 is subjected to vulcanization molding. Part of manufacturing processes for the pneumatic tire 1 is explained below. If the tread area 10 is to be molded during manufacture of the pneumatic tire 1, the mold 60 is used for vulcanizing the tread area 10. The mold 60 is formed into such a shape that convex and concave portions of the tread surface 11 are reversed. More specifically, the mold 60 includes a block-part mold 61 and a groove-part mold 62. The block-part mold 61 is of the concavely shape, which is reverse to the shape of the block 15 formed on the tread surface 11. The groove-part mold 62 is of the convex shape, which is reverse to the shape of the groove, 20 formed in the tread area 10. The groove-part mold 62 includes a protrusion-part mold 63 and a connection-member-part mold 64 which are of the concave shapes, which are reverse to the protrusion 30 and the connection member 40 formed convexly in the groove 20, respectively.

The connection-member-part mold 64 is located between the protrusion-part mold 63 and the block-part mold 61 and connected to both the protrusion-part mold 63 and the block-part mold 61. This is similar to the connection member 40 of the pneumatic tire 1 which is connected to both the protrusion 30 and the block 15. A vent hole 65 is formed in the block-part mold 61 to communicate the block-part mold 61 with the outside of the mold 60.

When the pneumatic tire 1 is to be vulcanized using the mold 60 thus formed, the mold 60 is situated in the outward of the tread rubber 70 in the tire radial direction. The tread rubber 70 is rubber that corresponds to the tread area 10, and that is part of a green tire which is the pneumatic tire 1 before the vulcanization molding. At this time, the mold 60 is directed so that the block-part mold 61, the groove-part mold 62, the protrusion-part mold 63, and the connection-member-part mold 64 oppose the tread rubber 70.

FIG. 9 is a schematic of the mold 60 and the tread rubber 70 for explaining the state in which the tread area 10 is being subjected to the vulcanization molding. When the pneumatic tire 1 is to be vulcanized, pressure is applied to the green tire from the inward to the outward in the tire radial direction. As a result, the tread rubber 70 contacts with the mold 60. The pressure is further applied to the green tire outward in the tire radial direction. The tread rubber 70 is thereby deformed to fit the shape of the mold 60 of the part opposing the tread rubber 70. In other words, the tread rubber 70 located in the block-part mold 61 flows into the concave block-part mold 61. Likewise, the tread rubber 70 flows into the concave protrusion-part mold 63 and the concave connection-member-part mold 64. Conversely, the tread rubber 70 contacts with the convex groove-part mold 62 in the early stage of the vulcanization molding.

In this manner, the tread rubber 70 is pressurized against the mold 60 from the inward to the outward in the tire radial direction during the vulcanization molding. However, because the tread rubber 70 contacts with the mold 60 from its part located inward of the mold 60 in the tire radial direction, the air present between the mold 60 and the tread rubber 70 flows from the inward to the outward in the tire radial direction. For example, the tread rubber 70 flows into the protrusion-part mold 63 from the inward to the outward in the tire radial direction. The air in the protrusion-part mold 63 flows to the outward in the tire radial direction. Furthermore, the convex portion 31 is formed on the protrusion 3 and is a portion of the protrusion 30, which portion protrudes outward in the tire radial direction. The air flowing in the tire radial direction during the vulcanization molding, therefore, flows to a portion of the protrusion-part mold 63 where the convex portion 31 is molded.

The connection-member-part mold 64 is connected to the protrusion-part mold 63. The connection-member-part mold 64 is formed outward in the tire radial direction relative to the protrusion-part mold 63, and connected to both the protrusion-part mold 63 and the block-part mold 61. This is similar to the connection member 40 formed so that its height from the groove bottom 24 is larger than that of the convex portion 31. Therefore, the tread rubber 70 flows into the protrusion-part mold 63. The air in the protrusion-part mold 63 flowing outward in the tire radial direction thereby flows in the direction of the block-part mold 61 through the connection-member-part mold 64.

More specifically, the connection member 40 is formed so that its height from the groove bottom 24 is getting larger from the convex-side end 41 toward the block-side end 42. The connection-member-part mold 64 is, therefore, formed to correspond to the connection member 40. Namely, the connection-member-part mold 64 is formed to gradually extend outward of the protrusion-part mold 63 in the tire radial direction from the protrusion-part mold 63 to the block-part mold 61. Therefore, the air flowing between the protrusion-part mold 63 mold 64 and the tread rubber 70 easily flows from the position corresponding to the convex-side end 41 toward the position corresponding to the block-side end 42. The air can thereby flow more surely from the direction of the protrusion-part mold 63 to the direction of the block-part mold 61.

The air in the block-part mold 61 flows outward in the tire radial direction by the flow of the tread rubber 70 into the block-part mold 61. Because the vent hole 65 is provided in the block-part mold 61, the air in the block-part mold 61 flowing outward in the tire radial direction flows into the vent hole 65, and is discharged from the vent hole 65 to the outside of the mold 60. With this discharge, the air in the protrusion-part mold 63 flowing in the direction of the block-part mold 61 through the connection-member-part mold 64 is also discharged to the outside of the mold 60 through the vent hole 65.

Figure 10:
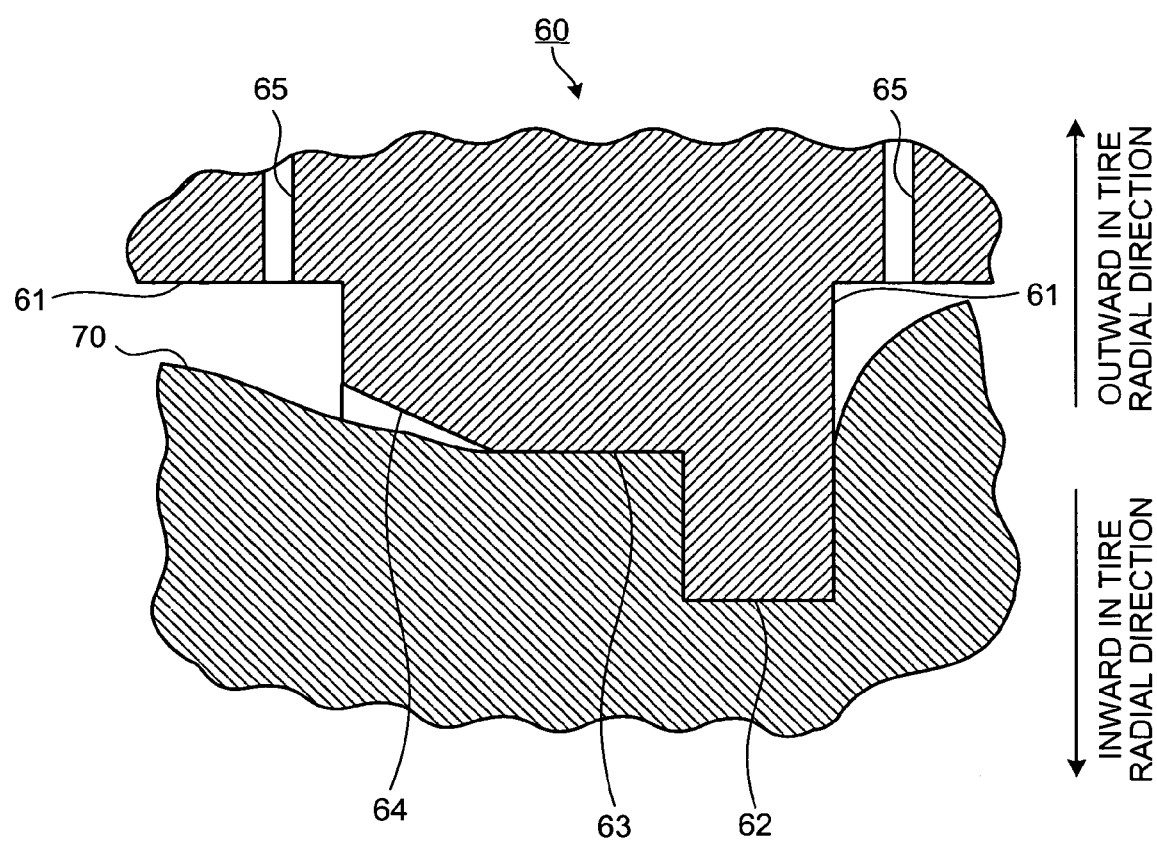
FIG. 10 is a schematic of the mold and the tread rubber for explaining the state in which the tread area is being subjected to the vulcanization molding and which is subsequent to the state shown in FIG. 9.

FIG. 10 is a schematic of the mold 60 and the tread rubber 70 for explaining the state in which the tread area 10 is being subjected to the vulcanization molding and which is subsequent to the state shown in FIG. 9. The tread rubber 70 is pressed outward in the tire radial direction during the vulcanization molding of the pneumatic tire 1 as shown in FIG. 9. The air in the protrusion-part mold 63 thereby flows in the direction of the block-part mold 61 through the connection-member-part mold 64, while the tread rubber 70 contacts with the mold 60 from its inward part in the tire radial direction.

Therefore, during the vulcanization molding of the pneumatic tire 1, the tread rubber 70 in the protrusion-part mold 63 contacts with the mold 60 more early than the tread rubber 70 in the connection-member-part mold 64. Consequently, almost all of the air present between the protrusion-part mold 63 of the mold 60 and the tread rubber 70 flows in the direction of the block-part mold 61 through the connection-member-part mold 64. Therefore, when the tread rubber 70 located in the protrusion-part mold 63 contacts with the protrusion-part mold 63 while the tread rubber 70 is continuously pressed, no air is left between the protrusion-part mold 63 and the tread rubber 70. In addition, almost all the tread rubber 70 located in and opposing the protrusion-part mold 63 directly contacts with the protrusion-part mold 63.

The tread rubber 70 located in the connection-member-part mold 64 contacts with the connection-member-part mold 64 after almost all the tread rubber 70 located in and opposing the protrusion-part mold 63 contacts with the protrusion-part mold 63. At this time, almost all the air between the connection-member-part mold 64 and the tread rubber 70 flows in the direction of the block-part mold 61 because the connection-member-part mold 64 is connected to the block-part mold 61. Therefore, when the tread rubber 70 in the connection-member-part mold 64 contacts with the connection-member-part mold 64, no air is left between the connection-member-part mold 64 and the tread rubber 70. In addition, almost all the tread rubber 70 located in and opposing the connection-member-part mold 64 directly contacts with the connection-member-part mold 64.

Because the vent hole 65 is formed in the block-part mold 61, the air present between the block-part mold 61 and the tread rubber 70 is discharged to the outside of the mold 60 through the vent hole 65. By continuously pressing the tread rubber 70, therefore, the air present between the block-part mold 61 and the tread rubber 70 is discharged to the outside of the mold 60. Accordingly, when the tread rubber 70 in the block-part mold 61 contacts the block-part mold 61, no air is left between the block-part mold 61 and the tread rubber 70 and almost all the tread rubber 70 located in and opposing the block-part mold 61 directly contacts with the block-part mold 61.

In this manner, the pneumatic tire 1 includes the protrusion 30 provided in each of the grooves 20 of the tread area 10 and formed so that its height from the groove bottom 24 is changed. The convex portion 31 of the protrusion 30 and the block 15 are connected to each other by the connection member 40. The connection member 40 is formed so that its height from the groove bottom 24 in the block-side end 42 is larger than that in the convex-side end 41. During manufacture of the pneumatic tire 1, the mold 60 for molding the tread area 10 is disposed outward of the tread rubber 70 in the tire radial direction, and the pressure is applied to the tread rubber 70 from inward to outward of the tread rubber 70 in the tire radial direction, thereby vulcanization-molding the tread area 10. During the vulcanization molding, the air present between the tread rubber 70 and the mold 60 flows into the portion located further outward in the tire radial direction. Accordingly, the air present between the tread rubber 70 and the protrusion-part mold 63 flows into the portion of the protrusion-part mold 63, which portion corresponds to the convex portion 31 of the protrusion 30. Furthermore, the height of the connection member 40 from the groove bottom 24 is larger than that of the convex portion 31. Therefore, the air present between the tread rubber 70 and the mold 60 flows from the protrusion-part mold 63 for molding the convex portion 31 to the connection-member-part mold 64. Moreover, because of the connection of the connection-member-part mold 64 to the block-part mold 61, the air between the connection-member-part mold 64 and the tread rubber 70 flows from the connection-member-part mold 64 to the block-part mold 61. Furthermore, the vent hole 65 is formed in the block-part mold 61.

With these features, during the vulcanization molding, the air between the protrusion-part mold 63 and the tread rubber 70 moves in the direction of the block-part mold 61 through the connection-member-part mold 64, and is discharged from the vent hole 65 to the outside of the mold 60. Therefore, the tread rubber 70 easily flows into the protrusion-part mold 63. Consequently, even if the height of the protrusion 30 is made larger or the volume thereof is increased to ensure the capability of preventing the stone 50 from being trapped within the groove 20 when the stone 50 enters the groove 20, that is, to ensure anti-stone-trapping capability, the tread rubber 70 can more reliably flow into the mold 60 for forming the protrusion 30 during manufacture of the pneumatic tire 1. Therefore, it is possible to reduce failure in manufacture or so-called "occurrence of bare", and to more surly obtain the targeted shape of the protrusion 30. Consequently, the occurrence of bare can be reduced while the anti-stone-trapping capability is ensured.

The height of the connection member 40 from the groove bottom 24 becomes gradually larger from the convex-side end 41 toward the block-side end 42. Therefore, when the pneumatic tire 1 is manufactured, the air between the protrusion-part mold 63 of the mold 60 and the tread rubber 70 and flowing from the protrusion-part mold 63 to the block-part mold 61 through the connection-member-part mold 64 more easily flows in the direction of the portion corresponding to the block-side end 42 which is the portion located outward in the tire radial direction. With this feature, the tread rubber 70 can more reliably flow into the protrusion-part mold 63, which makes it possible to more surely obtain the targeted shape of the protrusion 30. Consequently, the occurrence of bare can be more reliably reduced.

When the connection member 40 is formed so that its inclination angle θ with respect to the groove bottom 24 from the convex-side end 41 over the block-side end 42 is in the range from 3 degrees to 45 degrees, the occurrence of bare can be reduced while the anti-stone-trapping capability is more reliably ensured. More specifically, the inclination angle θ with respect to the groove bottom 24 from the convex-side end 41 over the block-side end 42 is set to 3 degrees or more, and it is thereby possible to prevent a difference in the tire radial direction between the convex portion 31 and the block-side end 42 from becoming too small. Therefore, because the block-part mold 61 side of the connection-member-part mold 64 is formed more surely outward in the tire radial direction than the protrusion-part mold 63 side thereof, the air flowing from between the protrusion-part mold 63 of the mold 60 and the tread rubber 70 to the direction of the block-part mold 61 through the connection-member-part mold 64 can more reliably flow in this direction during the vulcanization molding. With this feature, the tread rubber 70 can more surely flow into the protrusion-part mold 63, thus more reliably obtaining the targeted shape of the protrusion 30.

The inclination angle θ with respect to the groove bottom 24 from the convex-side end 41 over the block-side end 42 is set to 45 degrees or less. It is thereby possible to prevent the rigidity of the connection member 40 from becoming too high, and associated with this, the rigidity of the protrusion 30 connected to the connection member 40 can be prevented from being too high. With this feature, the protrusion 30 is formed to be elastic, and this allows the ejection action on the stone 50 by the elastic force of the protrusion 30 to be ensured, and the anti-stone-trapping capability can thereby be ensured. Therefore, by forming the connection member 40 so that its inclination angle θ with respect to the groove bottom 24 is in the range from 3 degrees to 45 degrees, the targeted shape of the protrusion 30 can be more surely obtained, and the stone 50, which has entered the groove 20, can be more reliably ejected. Consequently, the occurrence of bare can be reduced while the anti-stone-trapping capability is more surely ensured.

When the connection member 40 is formed so that the relation between the height h1 of the convex portion 31 and the width W of the connection member 40 is in the range of $0.05h1 \leq W \leq 1.0h1$, the occurrence of bare can be reduced while the anti-stone-trapping capability is more reliably ensured. More specifically, by setting the width W of the connection member 40 to be 0.05 times or more of the height h1 of the convex portion 31, the width of the connection member 40 can be increased to a predetermined width or more, and associated with this, the width of the connection-member-part mold 64 can be made to a predetermined width or more. This allows the air to easily flow between the connection-member-part mold 64 and the tread rubber 70 during the vulcanization molding. The air can, therefore, easily flow from the protrusion-part mold 63 to the block-part mold 61 during the vulcanization molding, and hence, the tread rubber 70 can easily flow into the protrusion-part mold 63. It is thereby possible to more surely obtain the targeted shape of the protrusion 30.

By setting the width W of the connection member 40 to be 1.0 time or less of the height h1 of the convex portion 31, the rigidity of the connection member 40 can be prevented from becoming too high, and associated with this, the rigidity of the protrusion 30 connected with the connection member 40 can be prevented from becoming too high. By so setting, the protrusion 30 can be formed to be elastic, and hence, the ejection action on the stone 50 by the elastic force of the protrusion 30 can be ensured, and the anti-stone-trapping capability can thereby be ensured. Therefore, by forming the connection member 40 so that the relation between the height h1 of the convex portion 31 and the width W of the connection member 40 is in the range of $0.05h1 \leq W \leq 1.0h1$, the targeted shape of the protrusion 30 can surely be obtained, and the stone 50, which has entered the groove 20, can thereby be more reliably ejected therefrom. Consequently, the occurrence of bare can be reduced while the anti-stone-trapping capability is more surely ensured.

Figure 11:
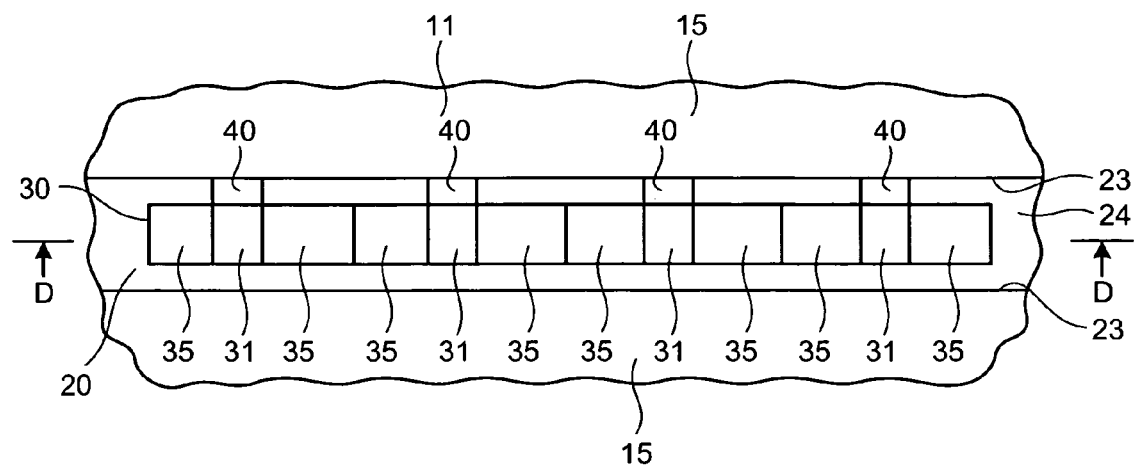
FIG. 11 is a detailed cross-section of a pneumatic tire according to another embodiment of the present invention.
Figure 12:
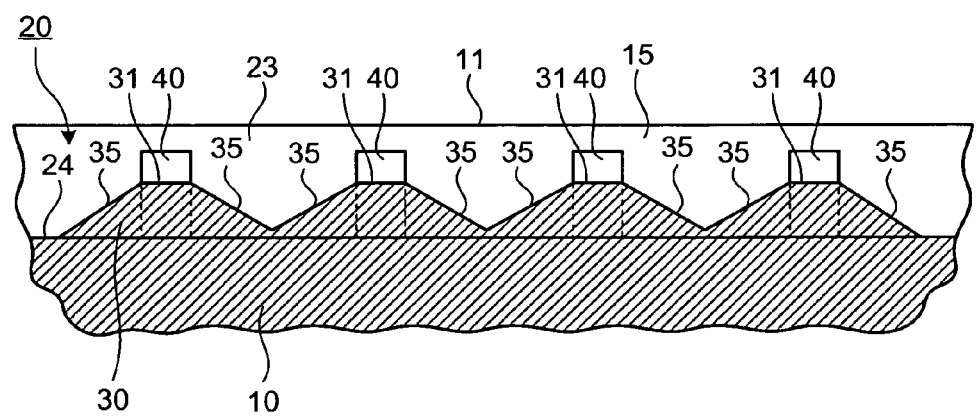
FIG. 12 is a cross-section taken along the line D-D of FIG. 11.

FIG. 11 is a detailed cross-section of a pneumatic tire according to another embodiment of the present invention. FIG. 12 is a cross-section taken along the line D-D of FIG. 11. In the preceding embodiment, one convex portion 31 is formed in one protrusion 30, but a plurality of convex portions 31 can be formed in one protrusion 30. For example, as shown in FIG. 11 and FIG. 12, in the protrusion 30, concavity and convexity may be repeated in the tire radial direction and a plurality of convex portions 31 which are convex outward in the tire radial direction are obtained. In this case, a plurality of connection members 40 may be formed so as to connect a plurality of the convex portions 31 to blocks 15, respectively. The convex portions 31 are formed on the protrusion 30, which allows improvement of the anti-stone-trapping capability. In addition, by connecting the connection members 40 to the convex portions 31, the targeted shape can be more surely obtained even if the convex portions 31 are formed in the protrusion 30. Consequently, the occurrence of bare can be reduced while the anti-stone-trapping capability is more reliably ensured.

Although only one connection member 40 is connected to one convex portion 31, a plurality of connection members 40 can be connected to one convex portion 31. For example, the connection member 40 is provided from one convex portion 31 toward both of opposite groove walls 23, and the connection members 40 can be connected to the respective groove walls 23, i.e. the respective blocks 15. In other words, the two blocks 15, which include the opposite groove walls 23, and the convex portion 31 of the protrusion 30, which is located between these blocks 15, can be connected to each other by the two connection members 40. With this structure, when the vulcanization molding is carried out, the air in the protrusion-part mold 63 is allowed to flow in the directions of two block-part molds 61 through two connection-member-part molds 64. Therefore, the tread rubber 70 can more surely flow into the protrusion-part mold 63. Consequently, the occurrence of bare can be more reliably reduced.

Although the height of the connection member 40 is getting larger from the convex-side end 41 toward the block-side end 42, the height of the connection member 40 from the groove bottom 24 can be changed step by step. Even if the height of the connection member 40 does not gradually change, the air between the protrusion-part mold 63 of the mold 60 and the tread rubber 70 can flow from the connection member 40 to the block-part mold 61 if the height of the connection member 40 from the groove bottom 24 is larger than that of the convex portion 31 from the groove bottom 24. This allows the tread rubber 70 to more surely flow into the protrusion-part mold 63. Consequently, the occurrence of bare can be more surely reduced.

Even if the height of the connection member 40 is not gradually changed, the connection member 40 is preferably formed so that its inclination angle θ with respect to the groove bottom 24 from the convex-side end 41 over the block-side end 42 is in the range from 3 degrees to 45 degrees. More specifically, even if the height of the connection member 40 is not gradually changed, the connection member 40 is preferably formed so that its inclination angle θ with respect to the groove bottom 24 is in the range from 3 degrees to 45 degrees, the inclination angle being from a portion of the convex-side end 41 located in its outside end in the tire radial direction to a portion of the block-side end 42 located in its outside end in the tire radial direction. By forming the connection member 40 so that the relation between the convex-side end 41 and the block-side end 42 falls within the range, the occurrence of bare can be reduced while the anti-stone-trapping capability is more reliably ensured.

The width of the connection member 40 in the direction in which the groove 20 is formed is almost equivalent to the width of the convex portion 31 of the protrusion 30 in the same direction as above. However, the width of the connection member 40 can be set different from the width of the convex portion 31. Widths of the connection member 40 and the convex portion 31 can be either equal to or different from each other. If both of them are connected to each other, the air can flow from the protrusion-part mold 63 of the mold 60 to the connection-member-part mold 64 during the vulcanization molding. In addition, the tread rubber 70 can more reliably flow into the protrusion-part mold 63. Consequently, the occurrence of bare can be more surely reduced.

As one example of the pneumatic tire 1, the pneumatic tire 1 including the block type tread has been explained above. However, the pneumatic tire 1 to which the present invention is applied can be the pneumatic tire 1 including any one of the ribbed tread, the ribbed-lug tread, and the like other than the block type tread. Even if the pneumatic tire 1 is other than the pneumatic tire 1 including the block type tread, it suffices that the connection member 40 is formed such that its height from the groove bottom 24 is larger than the height of the convex portion 31 of the protrusion 30 from the groove bottom 24. In addition, it suffices to form such a connection member 40 in the groove 20, in which it is connected to both the convex portion 31 and the land, similarly to the pneumatic tire 1 including the block type tread. In this manner, if the pneumatic tire 1 is the one that the protrusion 30 and the connection member 40 made in the above manner can be formed in the groove 20, a desired pattern can be used for the pattern shape of the tread. Even if the pneumatic tire 1 has any pattern shape, the occurrence of bare can be reduced while the anti-stone-trapping capability is ensured by forming the protrusion 30 and the connection member 40 in the groove 20 in the above manner.

Performance evaluation tests conducted on the conventional pneumatic tire and the pneumatic tire 1 according to the embodiments of the present invention are explained below.

The performance evaluation test was conducted on two items, i.e., anti-bare capability and the anti-stone-trapping capability.

The performance evaluation test was conducted using the pneumatic tire 1 of 11R22.5 size. Each test item was evaluated as follows. The anti-bare capability was evaluated by vulcanization-molding 20 pieces of pneumatic tires 1 and by determining how many pieces out of the 20 pneumatic tires 1 bare occurred to. It is assumed that if bare occurred to fewer pneumatic tires 1, then the pneumatic tires 1 are determined more excellent in the anti-bare capability. It is also assumed that if bare occurred to two pieces or less out of the 20 pieces of the pneumatic tires 1, then the pneumatic tires 1 are determined effective in the anti-bare capability.

The anti-stone-trapping capability was evaluated by attaching each of the pneumatic tires 1 to be tested assembled with a rim to a vehicle, performing a test run of the vehicle on a fixed course, and determining how many stones were trapped within the grooves 20 after the test run. The number of stones were evaluated using an index in which the number of stones in comparative example 1 explained later was set to 100. It is assumed that a higher index indicates more excellence in the anti-stone-trapping capability. It is also assumed that the anti-stone-trapping capability is ensured if the index is up to 95.

The pneumatic tires 1 to be tested include those according to seven examples (hereinafter, "examples 1 to 7") of the present invention, and those according to two comparative examples (hereinafter, "comparative examples 1 and 2"). These pneumatic tires 1 were tested in the above method. Each of the pneumatic tires 1 according to the examples 1 to 7 and the comparative examples 1 and 2 includes zigzag-shaped longitudinal grooves 21. In addition, a plurality of protrusions 30 are formed in each longitudinal groove 21. Each of the protrusion 30 has a height from the groove bottom 24 of four millimeters, a width in the groove width direction of 2.5 millimeters, and a length in the direction, in which the longitudinal groove 21 is formed, of 40 millimeters.

Among the pneumatic tires 1 including the protrusions 30 thus formed and to be tested, the pneumatic tire 1 according to the comparative example 1 includes no connection member 40. The pneumatic tire 1 according to comparative example 2 includes the connection member 40. However, the relation between the height h1 of the convex portion 31 from the groove bottom 24 and the height h2 of the connection member 40 from the groove bottom 24 is h2=h1. The inclination angle of the outward surface 43 of the connection member 40 with respect to the groove bottom 24 is zero degree. In addition, the ratio (W/h1) of the width W of the connection member 40 to the height h1 of the convex portion 31 is 0.15.

On the other hand, according to the examples 1 to 7, the relation between the height h1 of the convex portion 31 from the groove bottom 24 and the height h2 of the connection member 40 from the groove bottom 24 is h2>h1. Furthermore, in the example 1, the inclination angle of the outward surface 43 of the connection member 40 with respect to the groove bottom 24 is two degrees, and the ratio (W/h1) of the width W of the connection member 40 to the height h1 of the convex portion 31 is 0.5. Likewise, in the example 2, the inclination angle is four degrees and the ratio (W/h1) is 0.5. In the example 3, the inclination angle is four degrees and the ratio (W/h1) is 0.05. In the example 4, the inclination angle is 15 degrees and the ratio (W/h1) is 0.5. In the invention 5, the inclination angle is 40 degrees and the ratio (W/h1) is 0.5. In the example 6, the inclination angle is 50 degrees and the ratio (W/h1) is 0.2. In the example 7, the inclination angle is 4 degrees and the ratio (W/h1) is 1.0.

The evaluation tests were conducted on the pneumatic tires 1 according to the comparative example 1 and the comparative example 2 and according to the examples 1 to 7 using the method. Test results are shown in Table 1 to Table 2. Table 1 depicts the results of the evaluation tests conducted on the pneumatic tires 1 according to the comparative example 1 and the comparative example 2 and the pneumatic tires 1 according to the examples 1 to 3. Table 2 depicts the results of the evaluation tests conducted on the pneumatic tires 1 according to the examples 4 to 7.

TABLE 1

|  | Comparative Example 1 | Comparative Example 2 | Example 1 | Example 2 | Example 3 |
|---|---|---|---|---|---|
| Connection Member | Not provided | h2 = h1 | h2 > h1 | h2 > h1 | h2 > h1 |
| Inclination angle (°) | — | 0 | 2 | 4 | 4 |
| Width of Connection Member (W/h1) | — | 0.15 | 0.5 | 0.5 | 0.05 |
| Number of occurrences of bare (/20 pieces) | 18 | 9 | 2 | 0 | 1 |
| Anti-stone-trapping capability | 100 | 100 | 100 | 100 | 100 |

TABLE 2

|  | Example 4 | Example 5 | Example 6 | Example 7 |
|---|---|---|---|---|
| Connection Member | h2 > h1 | h2 > h1 | h2 > h1 | h2 > h1 |
| Inclination angle (°) | 15 | 40 | 50 | 4 |
| Width of Connection Member (W/h1) | 0.5 | 0.5 | 0.2 | 1.0 |
| Number of occurrences of bare (/20 pieces) | 0 | 0 | 0 | 0 |
| Anti-stone-trapping capability | 100 | 100 | 97 | 96 |

As clear from the test results shown in Tables 1 and 2, if the connection member 40 is not formed, the air between the tread rubber 70 and the protrusion-part mold 63 in the mold 60 could not be easily discharged during the vulcanization molding, and the tread rubber 70 does not easily flow into the protrusion-part mold 63. Due to this, bare easily occurs (see comparative example 1). If the connection member 40 is formed but the height h2 of the connection member 40 from the groove bottom 24 is equal to the height h1 of the convex portion 31 of the protrusion 30, the air between the tread rubber 70 and the protrusion-part mold 63 in the mold 60 does not easily flow in the direction of the connection-member-part mold 64 during the vulcanization molding of the pneumatic tire 1. Easiness of flow of the tread rubber 70 into the protrusion-part mold 63 is not, therefore, much improved. As a result, it is difficult to reduce the occurrence of bare (see comparative example 2).

On the other hand, according to the examples 1 to 7, the connection member 40 is formed so that the relation between the height h2 of the connection member 40 from the groove bottom 24 and the height h1 of the convex portion 31 of the protrusion 30 is h2>h1. The connection member 40 is connected to the protrusion 30. Therefore, the air between the tread rubber 70 and the protrusion-part mold 63 in the mold 60 can easily flow in the direction of the connection-member-part mold 64 during the vulcanization molding of the pneumatic tire 1. Easiness of flow of the tread rubber 70 into the protrusion-part mold 63 can be thereby improved, thus allowing reduction in the occurrence of bare. Because of the reduction in the occurrence of bare, the targeted shape of the protrusion 30 can be obtained. It is, therefore, possible to ensure the anti-stone-trapping capability by providing the protrusions 30 in the groove 20.

According to one aspect of the present invention, the occurrence of bare can be reduced while ensuring the anti-stone-trapping capability.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pneumatic tire having a tread area, the tread area being divided into a plurality of lands by virtue of a plurality of grooves extending in a tire circumferential direction and a plurality of grooves extending in a lateral direction, and each circumferentially extending groove having a bottom and a plurality of walls connecting the bottom of the circumferentially extending groove to the lands, the pneumatic tire comprising:
a plurality of protrusions formed on the bottom of each of the circumferentially extending grooves and spaced from walls of the circumferentially extending groove, a height of the protrusion from the bottom of the circumferentially extending groove in a profile of the protrusion in a circumference direction of the pneumatic tire being variable, the protrusion including at least one peak portion that protrudes away from a center of the pneumatic tire; and
each protrusion being directly connected to only one adjacent wall of the circumferentially extending groove by a connection member, the connection member having a first end connected to the adjacent wall and a second end connected to the peak portion,
wherein a height of the first end from the bottom of the circumferentially extending groove is larger than a height of the second end from the bottom of the circumferentially extending groove, and a distance of the first end from the adjacent wall is smaller than a distance of the second end from the adjacent wall, and
a location of each connection member in the circumferentially extending groove corresponds to a location of an intersection of the circumferentially extending groove and the laterally extending groove such that the connection member extends from the adjacent wall toward the laterally extending groove.

2. The pneumatic tire according to claim 1, wherein the height of the connection member gradually increases from the second end toward the first end.

3. The pneumatic tire according to claim 1, wherein an angle between a surface that connects the first end to the second end and the bottom of the groove is from 3 degrees to 45 degrees.

4. The pneumatic tire according to claim 1, wherein a width W of the connection member satisfies $0.05h \leq W \leq 1.0h$, where h is a height of the peak portion from the bottom of the groove.

5. The pneumatic tire according to claim 1, adjacent ones of the protrusions in the circumference direction are continuous with one another.

6. The pneumatic tire according to claim 1, wherein adjacent ones of the protrusions in the circumference direction are separate from one another.

* * * * *